United States Patent

Hatakeyama et al.

Patent Number: 6,042,236
Date of Patent: Mar. 28, 2000

[54] PROJECTION TYPE VIDEO IMAGE DISPLAY DEVICE

[75] Inventors: Atsushi Hatakeyama, Ibaraki; Shigekazu Yamagishi, Takatsuki, both of Japan

[73] Assignee: Matsushita Electric Industrial Co., Ltd., Osaka, Japan

[21] Appl. No.: 09/050,039

[22] Filed: Mar. 30, 1998

[30] Foreign Application Priority Data

Apr. 10, 1997 [JP] Japan ..................................... 9-091918
May 29, 1997 [JP] Japan ..................................... 9-139483

[51] Int. Cl.$^7$ .................................................. G03B 21/14
[52] U.S. Cl. ................................................ 353/31; 353/20
[58] Field of Search ..................................... 348/752, 744, 348/762, 767; 353/20, 30, 31, 34, 37, 38, 81, 84; 349/5, 9

[56] References Cited

U.S. PATENT DOCUMENTS

| | | | |
|---|---|---|---|
| 5,067,799 | 11/1991 | Gold et al. | 359/490 |
| 5,074,645 | 12/1991 | Gold et al. | 359/465 |
| 5,515,202 | 5/1996 | Wright | 359/634 |
| 5,541,673 | 7/1996 | Shioya et al. | 348/752 |
| 5,743,610 | 4/1998 | Yajima et al. | 353/31 |
| 5,844,637 | 12/1998 | Katsumata | 349/8 |
| 5,875,008 | 2/1999 | Takahara et al. | 349/5 |
| 5,879,065 | 3/1999 | Shirochi et al. | 353/20 |
| 5,909,259 | 6/1999 | Ishino | 349/9 |

*Primary Examiner*—William Dowling
*Attorney, Agent, or Firm*—McDermott, Will & Emery

[57] ABSTRACT

A light source for emitting a white light in one direction, color light separating means for separating the white light from the light source into three color lights of red light, blue light and green light, modulating means including liquid crystal light valves for modulating the polarized lights contained in the luminous fluxes from the color light separating means, and producing a video image, color light combining means for combining the modulated luminous fluxes after being modulated by the modulating means, and projection optical means for projecting the combined luminous flux obtained by the color light combining means on a screen. A polarizer is disposed at the light exit side of the modulating means. A dichroic filter having characteristics for selectively passing and selectively reflecting the color lights from the modulating means is disposed between the color light combining means and the modulating means positioned on an optical path of at least one color light of the three color lights of the red light, blue light and green light. The quarter-wave plate has a plurality of quarter-wave plates, a first quarter-wave plate of the plurality of quarter-wave plates is contacting with the dichroic filter, and a second quarter-wave plate of the plurality of quarter-wave plates contacts the dichroic filter, and is disposed between the dichroic filter and the color light combining means.

13 Claims, 8 Drawing Sheets

PROJECTION TYPE VIDEO IMAGE DISPLAY DEVICE

TECHNICAL FIELD OF THE INVENTION

The present invention relates to a projection type display device for separating a white color luminous flux from a light source into three color luminous fluxes of red, blue and green, optically modulating these luminous fluxes through a light valve, recombining modulated luminous fluxes of each color after optical modulation, and magnifying and projecting an image on a screen. More particularly, the invention relates to a structure for preventing light crosstalk or the like in a dichroic prism for composing color light combining means in an optical system of such projection type display device.

BACKGROUND OF THE INVENTION

A projection type display device mainly comprises a light source, color light separating means for separating a white color luminous flux emitted therefrom into color luminous fluxes of three primaries, three liquid crystal light valves for optically modulating separated luminous fluxes of each color, color light combining means for combining modulated luminous fluxes of the optically modulated colors through these liquid crystal light valves, and a projection lens for magnifying and projecting the combined modulated luminous flux on a screen.

FIG. 8 is a conceptual diagram showing a basic constitution of a conventional projection type display device. Referring to FIG. 8, the process until an image is magnified and projected on a screen is described.

A natural light emitted from a light source 201 passes through an illuminating optical system composed of a first integrator 202a, a reflection mirror 207, and a second integrator 202b, and goes toward a first dichroic mirror 203 which passes blue and reflects green and red.

The blue light passing through the first dichroic mirror 203 is reflected by a reflection mirror 207B, focused by a field lens 205B, and reaches modulating means 100B. On the other hand, of the green light and red light, the green light is reflected by a second dichroic mirror 204 which reflects green and passes red, and is focused by a field lens 205G, and reaches modulating means 100G.

The red light passes through the second dichroic mirror 204, and is focused by a field lens 205R through first relay lens 206a, reflection mirror 207R, second relay lens 206b, and reflection mirror 207R, and reaches modulating means 100R. Herein, the color lights modulated by the modulating means 100B, 100G, 100R according to the video signal corresponding to the colors are put into a dichroic prism 105.

FIG. 7 is a detailed diagram of modulating means and color light combining means shown in FIG. 8. As the color light combining means, generally, the dichroic prism 105 is used, and this dichroic prism 104 is composed by mutually gluing four triangular prisms of same shape. Moreover, on the X-shaped glued surface, a reflection layer of dielectric film or the like having a selective reflection characteristic (or selective transmission characteristic) of a specific color is formed, and a blue light reflection plane 1051B and a red light reflection plane 1051R are provided.

Color lights modulated according to the video signal corresponding to the colors by the modulating means 100B, 100G, and 100R composed of incident side polarizer 107, liquid crystal light valve 101, and exit side polarizer 102 are combined by the dichroic prism 105 (color light combining means), and projected on a screen (not shown) through a projection lens 106 which is projection optical means.

Herein, the modulated luminous flux of each color passing through the modulating means 100B, 100G, 100R either passes through the dichroic prism 105, or is reflected by the blue light reflection plane 1051B or is reflected by the red light reflection plane 1051R for composing the X-shaped reflection plane, and is emitted to the side of the projection lens 106.

However, a slight portion of the light is not reflected by blue light reflection plane 1051B or the red light reflection plane 1051R for composing the X-shaped reflection plane, but passes through, and may reach up to the back side of the liquid crystal light valve 101 for composing the modulating means 100B, 100R confronting each other across the dichroic prism 105.

For example, the blue modulated luminous flux passes through the blue light reflection plane 1051B of the dichroic prism 105, leaves the red luminous flux incident plane 105R, and enters the back side of the liquid crystal light valve 101 of the red color modulating means 100R.

Similarly, the red modulated luminous flux passes through the red light reflection plane 1051R of the dichroic prism 105, leaves the blue luminous flux incident plane 105R, and enters the back side of the liquid crystal light valve 101 of the blue color modulating means 100B.

Furthermore, the green modulated luminous flux may be slightly reflected by the red light reflection plane 1051R or blue light reflection plane 1051B of the dichroic prism 105, and may enter the back side of the liquid crystal light valve 101 of the red color modulating means 100R and the back side of the liquid crystal valve 101 of the blue color modulating means 100B.

In this way, if the light enters from the back side of the liquid crystal light valve 101 into the liquid crystal light valve 101, the liquid crystal light valve 101 may malfunction and other adverse effects may be caused.

Thus, it is a first problem that the light emitted from modulating means for other color enters the back side of the liquid crystal light valve 101 for each color as leak light from the dichroic prism 105 to cause adverse effects on the liquid crystal light valve 101, and in particular the effect is greater by the blue light which is light at the shorter wavelength side.

Moreover, the modulated luminous fluxes of red, blue and green passing through the modulating means for each color may be slightly reflected by the incident planes 105B, 105G, 105R of each dichroic prism and the exit side polarizer surface 102S, and may enter each liquid crystal light valve 101 from the back side as return light.

Such return light is one of the factors to cause malfunction of the liquid crystal light valve 101 as mentioned in the first problem, and hence it is a second problem.

To solve these problems, hitherto, it has been proposed to install an absorption type filter between the color combining means and modulating means as disclosed in Japanese Laid-open Patent No. 8-184797. The absorption type filter is, however, small in the degree of freedom for setting the spectral characteristic, and is not sufficient to prevent the harmful light completely depending on the color light. If composed to prevent completely, the transmission rate of the usable color lights is decreased.

It is hence an object of the invention to present a projection type video image display device comprising an optical system capable of solving such problems.

SUMMARY OF THE INVENTION

A projection type video image display device of the invention comprises:

a light source for emitting a white light in one direction, color light separating means for separating the white light from the light source into three color lights of red light, blue light and green light, modulating means comprising light valves for modulating the polarized lights contained in the luminous fluxes from the color light separating means, and producing a video image, color light combining means for combining the modulated luminous fluxes after being modulated by the modulating means, and projection optical means for projecting the combined luminous flux obtained by the color light combining means on a screen.

Moreover, a dichroic filter having characteristics for selectively passing and selectively reflecting the color lights from the modulating means, and a quarter-wave plate are both disposed between the color light combining means and the modulating means positioned on an optical path of at least one color light of the three color lights of the red light, blue light and green light.

In this constitution, the color light which must be reflected by the color light combining means is prevented from being passed through, and the color light which must be passed through the color light combining means is prevented from being reflected. Hence, the color light returning in the direction of the light valve through the color light combining means is shut off.

Therefore, the color light entering from the back side of the light valve is shut off, and malfunction of the light valve is prevented. As a result, a sharp video image is obtained.

DETAILED DESCRIPTION OF THE INVENTION

Figure 1:
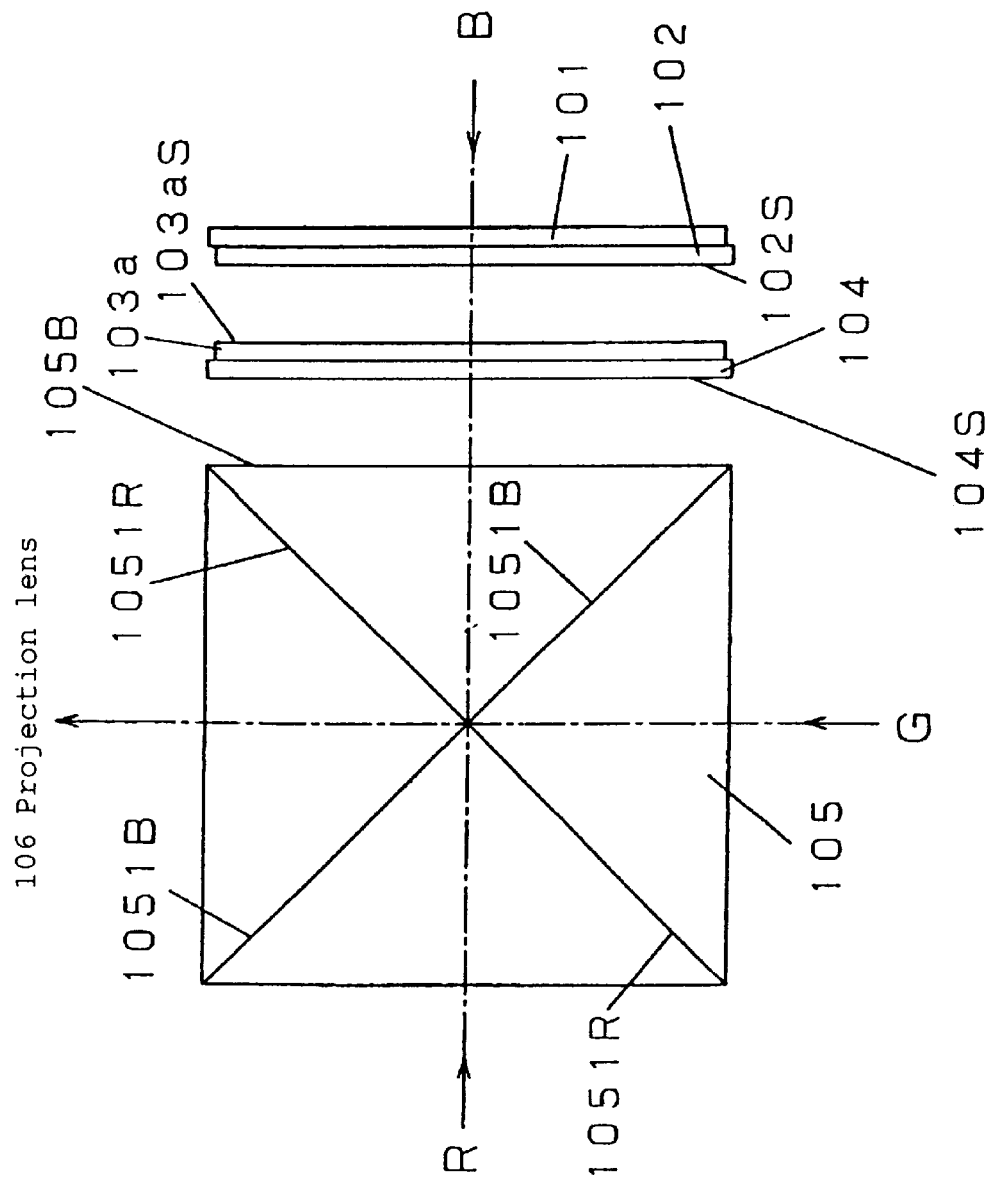
FIG. 1 is a block diagram of embodiment 1 of a projection type video image display device of the invention.

A projection type video image display device of the invention comprises:

a light source for emitting a white light in one direction, color light separating means for separating the white light from the light source into three color lights of red light, blue light and green light, modulating means comprising light valves for modulating the polarized lights contained in the luminous fluxes from the color light separating means, and producing a video image, color light combining means for combining the modulated luminous fluxes after being modulated by the modulating means, and projection optical means for projecting the combined luminous flux obtained by the color light combining means on a screen, wherein a dichroic filter having characteristics for selectively passing and selectively reflecting the color lights from the modulating means, and a quarter-wave plate are both disposed between the color light combining means and the modulating means positioned on an optical path of at least one color light of the three color lights of the red light, blue light and green light.

In other projection type video image display device, conforming to the above constitution, a dichroic filter having characteristics for selectively passing and selectively reflecting the color lights from the modulating means is disposed between the color light combining means and the modulating means positioned on an optical path of at least one color light of the three color lights of the red light, blue light and green light, and a first quarter-wave plate is disposed between the dichroic filter and the modulating means.

In other different projection type video image display device, conforming to the above constitution, a dichroic filter having characteristics for selectively passing and selectively reflecting the color lights from the modulating means is disposed between the color light combining means and the modulating means positioned on an optical path of at least one color light of the three color lights of the red light, blue light and green light, a first quarter-wave plate is disposed between the dichroic filter and the modulating means, and a second quarter-wave plate is disposed between the dichroic filter and the color light combining means.

In other different projection type video image display device, conforming to the above constitution, a polarizer is disposed at the light exit side of the modulating means, a dichroic filter having characteristics for selectively passing and selectively reflecting the color lights from the modulating means is disposed between the color light combining means and the modulating means positioned on an optical path of at least one color light of the three color lights of the red light, blue light and green light, a first quarter-wave plate is disposed between the dichroic filter and the modulating means, and a second quarter-wave plate is disposed between the dichroic filter and the color light combining means.

In other different projection type video image display device, conforming to the above constitution, a dichroic filter having characteristics for selectively passing and selectively reflecting the color lights from the modulating means is disposed between the color light combining means and the modulating means positioned on an optical path of at least one color light of the three color lights of the red light, blue light and green light, a first quarter-wave plate is disposed between the dichroic filter and the modulating means, a second quarter-wave plate is disposed between the dichroic filter and the color light combining means, and polarizing direction converting means is disposed between the second quarter-wave plate and the color light combining means.

In other different projection type video image display device, conforming to the above constitution, a polarizer is disposed at the light exit side of the modulating means, a dichroic filter having characteristics for selectively passing and selectively reflecting the color lights from the modulating means is disposed between the color light combining means and the modulating means positioned on an optical path of at least one color light of the three color lights of the red light, blue light and green light, a first quarter-wave plate is disposed between the dichroic filter and the modulating means, a second quarter-wave plate is disposed between the dichroic filter and the color light combining means, and polarizing direction converting means is disposed between the second quarter-wave plate and the color light combining means.

In other different projection type video image display device, conforming to the above constitution, a polarizer is disposed at the light exit side of the modulating means, a dichroic filter having characteristics for selectively passing and selectively reflecting the color lights from the modulating means is disposed between the color light combining means and the modulating means positioned on an optical path of at least one color light of the three color lights of the red light, blue light and green light, a first quarter-wave plate is disposed between the dichroic filter and the modulating means, polarizing direction converting means is disposed between the dichroic filter and the color light combing means, closely to the color light combining means, and a second quarter-wave plate is disposed between the dichroic filter and the color light combining means.

In the following embodiments, two quarter-wave length plates by joining the first quarter-wave plate and second quarter-wave plate may function as one half-wave plate.

In these constitutions, the first quarter-wave plate and second quarter-wave plate may be individually disposed so that the polarized light from the modulating means may enter as the light in the polarizing direction determined by the color light combining means.

Embodiment 1

Figure 7:
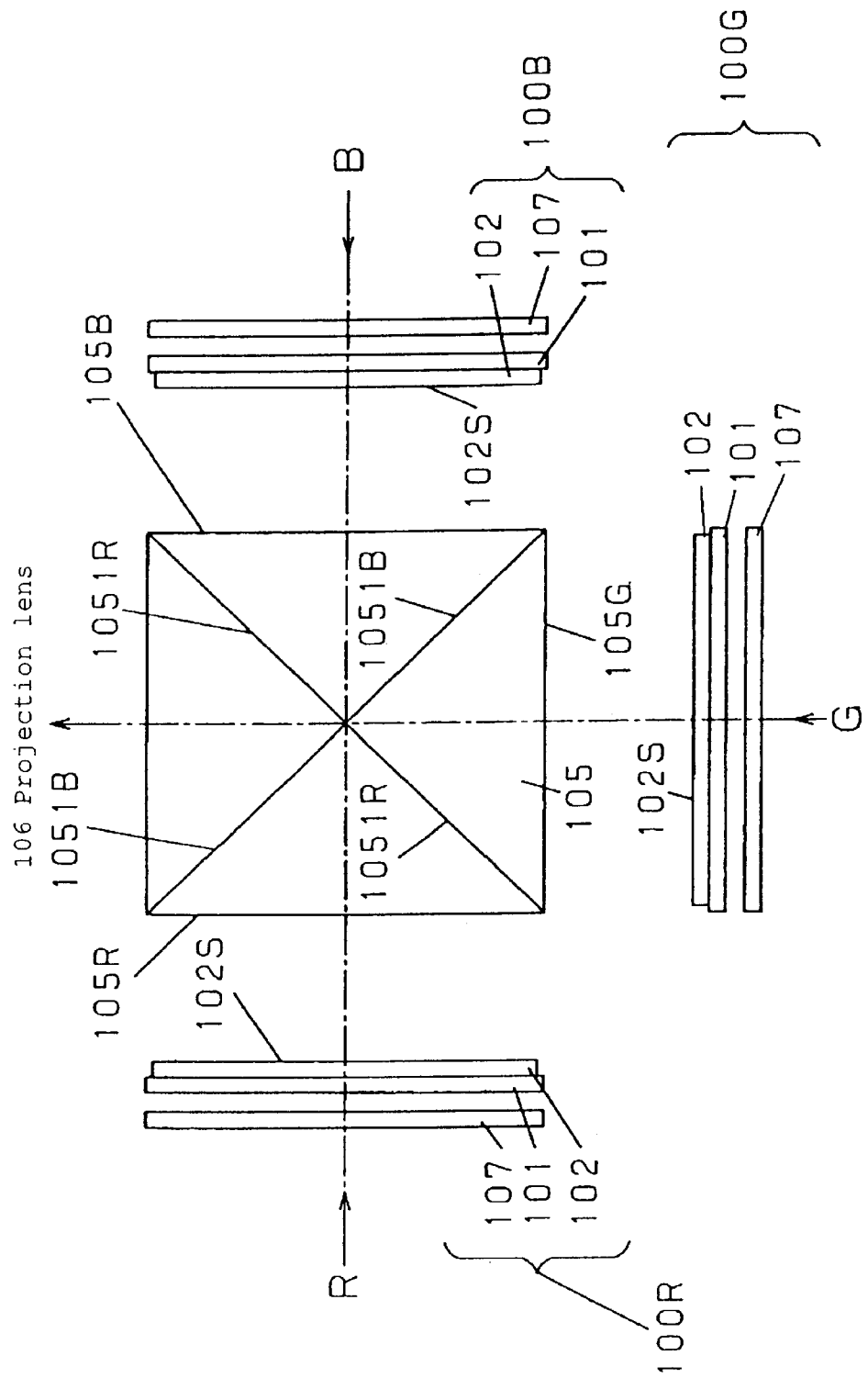
FIG. 7 is a detailed drawing of modulating means and color combining means of a conventional projection type video image display device.

FIG. 1 is a schematic block diagram for explaining embodiment 1, in which a first quarter-wave plate 103a is disposed at the modulating means side between the blue color modulating means 100B and the dichroic prism 105 as the color light combining means shown in FIG. 7 relating to the prior art, and further a dichroic filter 104 having a function of selectively passing and selectively reflecting the color light is inserted.

This constitution solves the first problem that the color light emitted from modulating means for other color enters the back side of the liquid crystal light valve 101 using the liquid crystal for blue color as leak light from the dichroic prism 105 to cause adverse effects. Since the inserted dichroic filter 104 has the function of selectively passing and selectively reflecting the color light, only the modulated blue light is passed, and the leak light (a slight green light and red light) emitted through the dichroic prism 105 is reflected to the color light combining means, and hence does not reach the blue color modulating means side. That is, malfunction and other adverse effects by leak light to the back side of the liquid crystal light valve 101 for blue color are eliminated by this constitution.

Concerning the second problem of the modulated luminous flux of blue color slightly reflected by the blue color incident plane 105B of the dichroic prism 105 and the face side of the dichroic filter 104S, and entering each liquid crystal light valve 101 from the back side as return light, the return light from the incident plane 105B of the blue light of the dichroic prism is eliminated by the function of the first quarter-wave plate 103a at the modulating means side as described below.

The blue polarized light emitted from the exit side polarizer 102 for composing the blue light modulating means 100B passes through the first quarter-wave plate 103a at the modulating means side, and becomes elliptical polarized light or circular polarized light, and passes through the dichroic filter 104. Herein, the optical axis of the first quarter-wave plate 103a is disposed so as to be nearly 45 degrees to the axis of the incident blue linear polarized light. The blue luminous flux slightly reflected by the blue luminous flux incident plane 105B of the dichroic prism 105 becomes an inverse elliptical polarized light or circular polarized light, and passes through the dichroic filter 104 as return light, and becomes a polarized light rotated by nearly 90 degrees from the oscillation direction of the polarized light when emitted from the modulating means through the first quarter-wave plate 103a. The polarized light enters the exit side polarizer 102 and is absorbed, and hence does not reach the back side of the liquid crystal light valve 101. That is, malfunction and other adverse effects by the return light reflected by the blue light incident plane 105B of the dichroic prism are eliminated.

Similarly, the return light reflected by the face side of the dichroic filter 104S enters the exit side polarizer 102 and is absorbed by the function of the first quarter-wave plate 103a at the modulating means side, and hence does not reach the back side of the liquid crystal light valve 101. That is, malfunction and other adverse effects by the return light reflected by the face side of the dichroic filter 104S are eliminated.

As for the liquid crystal light valve 101 used in the modulating means of red light and green light, the same effects are obtained by the function of the dichroic filter 104 for each color and the first quarter-wave plate 103a at the modulating means side disposed in the dichroic filter 104.

Figure 8:
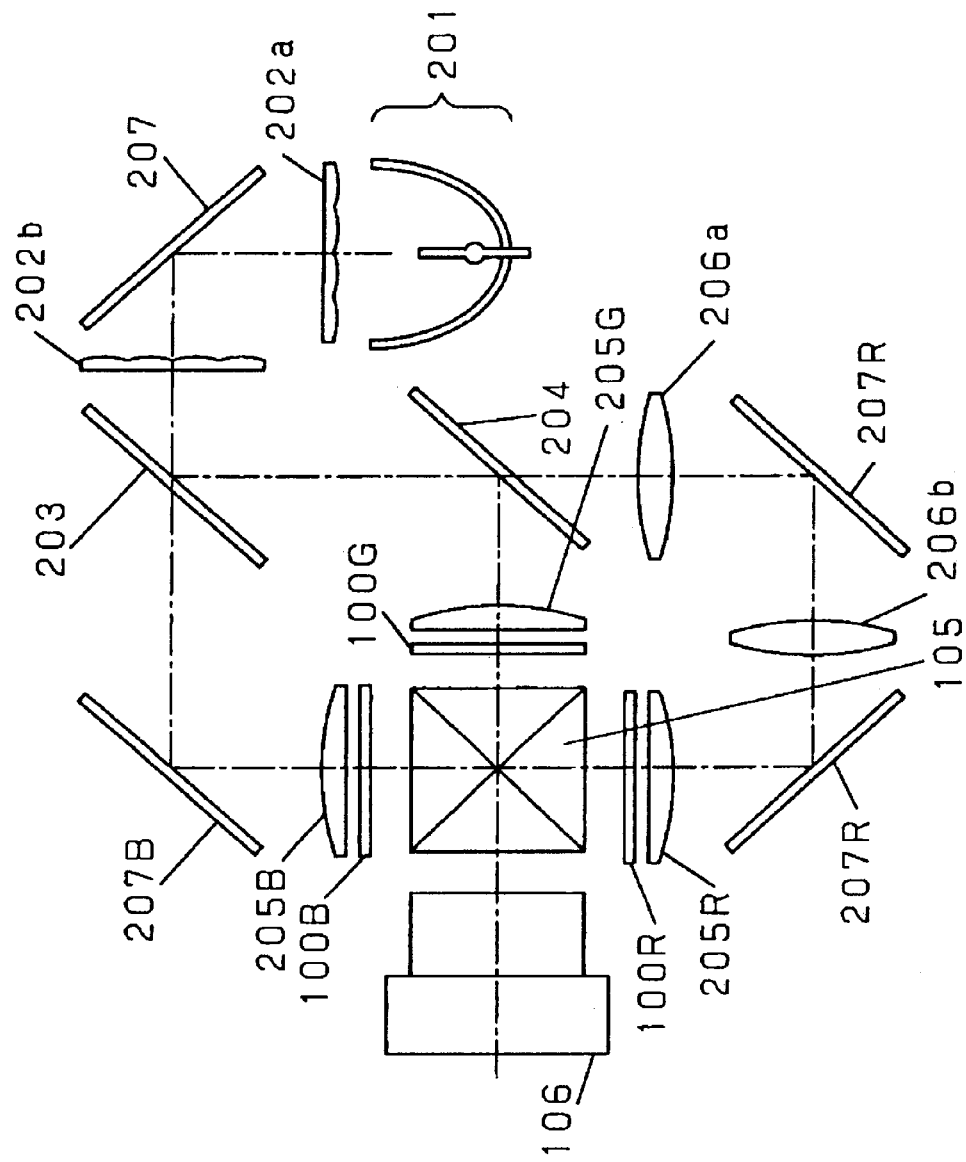
FIG. 8 is a conceptual diagram showing a basic constitution of a conventional projection type video image display device.

However, it is not required to insert into all optical paths, but it may be inserted at least in one optical path depending on the degree of adverse effects of crosstalk due to harmful light. The effects of the present invention are readily obtained by inserting the quarter wave plate and dichroic filter in the conventional system shown in FIG. 8, and it is advantageous that the optical parts used in the color light combining means and modulating means are not required to be particular parts. Although not mentioned specifically, the constituent optical members are coated with anti-reflection treatment (generally AR coating) on the surface contacting with the air.

Embodiment 2

Figure 2:
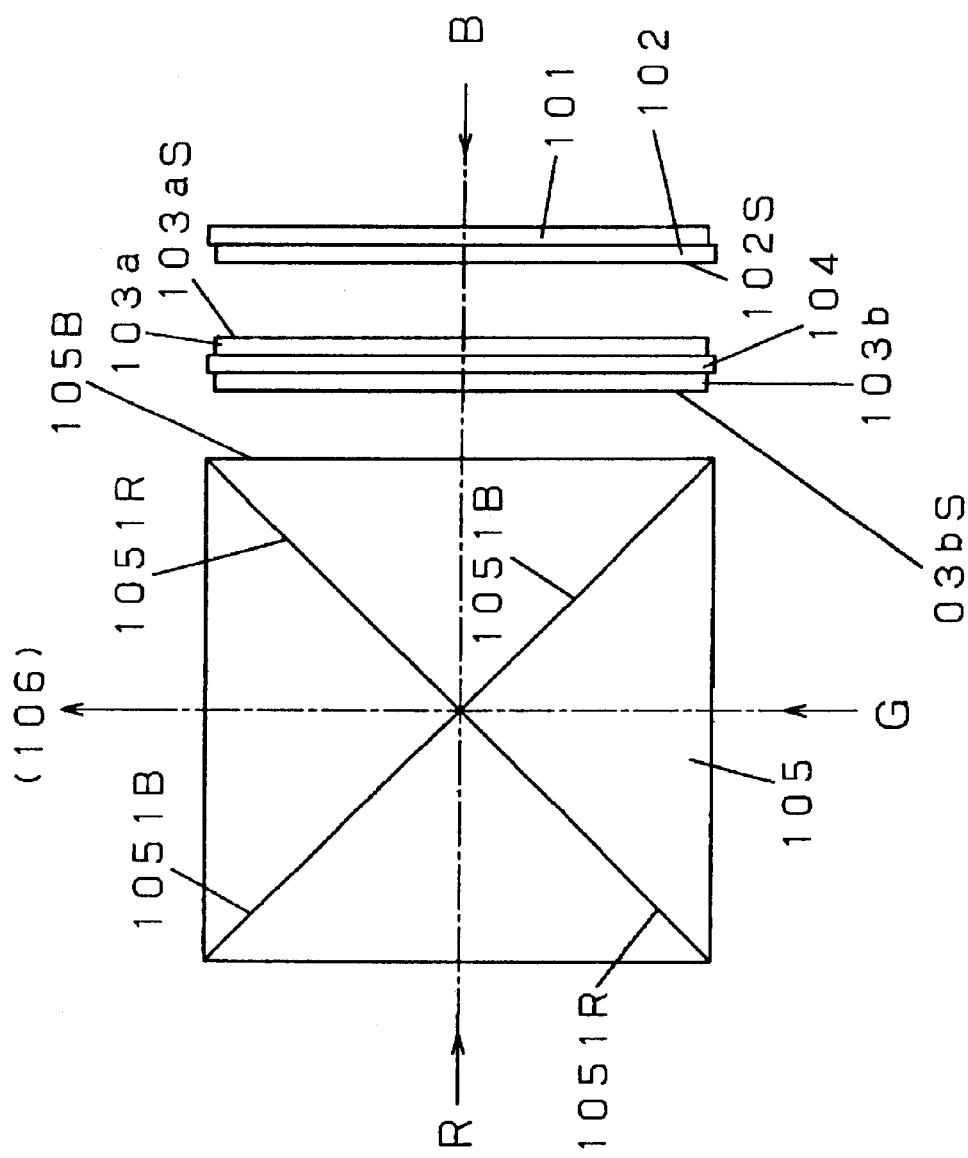
FIG. 2 is a block diagram of embodiment 2 of a projection type video image display device of the invention.

FIG. 2 is a schematic block diagram showing embodiment 2. At the color light combining means side of the dichroic filter 104 comprising the first quarter-wave plate 103a of the modulating means side disposed at the modulating means side in embodiment 1, further, a second quarter-wave plate 103b of color light combining means side is provided.

The color light emitted from the modulating means for color light directing toward the back side of the liquid crystal light valve 101 for blue color as leak light from the dichroic prism 105 passes through the second quarter-wave plate 103b at the color light combining means side, and becomes an elliptical polarized light or circular polarized light, and is reflected by the dichroic mirror 104 to be return light, and becomes an inverse elliptical polarized light or circular polarized light, and passes again the second quarter-wave plate 103b at the color light combining means side. In this constitution, the axis of polarization of the incident leak light is a polarized light rotated on the axis of polarization by nearly 90 degrees, and returns reversely to the optical path from which it is emitted. The polarized light of the return light rotated nearly 90 degrees on the axis of polarization is absorbed by the exit side polarizer 102 of each optical path, and hence does not reach the back side of the liquid crystal light valve 101.

In the foregoing embodiment 1, if the leak light as the return light by reflecting to the color light combining side by the dichroic mirror 104 returns reversely to the optical path from which it is emitted while being attenuated, and reaches the back side of the modulated liquid crystal light valve 101, a new problem may occur, and such new problem is solved by the constitution of this embodiment.

As for the liquid crystal light valve 101 used in the modulating means of red light and green light, the same effects may be obtained by the function of the dichroic filter 104 for each color and the second quarter-wave plate 103b at the color light combining means provided in the dichroic filter 104. However, the configuration of the optical axis of the second quarter-wave plate 103b at the color light combining means side and the optical axis of the first quarter-wave plate 103a at the modulating means side may be considered in two manners.

In a first configuration, the optical axis of the first quarter-wave plate 103a is orthogonal to the optical axis of the second quarter-wave plate 103b. It is intended not to change the axis of the polarized light from each modulating means toward the projection lens 106. In this case, however, if the dichroic prism 105 is used as the color light combining means, it is necessary to enter by S-polarized light on the prism reflection plane, and the transmission axis direction of the exit side polarizer 102 of the modulating means of red light and blue light is the oscillation direction of S-polarized light on the prism reflection plane.

In a second configuration, both the first quarter-wave plate 103a at the modulating means side and the second quarter-wave plate 103b at the color light combining means are disposed on the same optical axis. That is, the two quarter-wave plates are designed to act as one half-wave plate. In this case, however, if the dichroic prism 105 is used as the color light combining means, it is necessary to enter by S-polarized light on the prism reflection plane, and the transmission axis direction of the exit side polarizer 102 of the modulating means of red light and blue light is the oscillation direction (P-polarized light) vertical to the S-polarized light on the prism reflection plane.

Thus, in the constitution in which the polarized light passing through one quarter-wave plate is nearly a perfect circular polarized light, the depending on the color light combining means, the oscillation direction of the polarized light emitted from the modulating means may be limited in the vertical direction or horizontal direction, and the oscillation direction of the polarized light delivered from the modulating means may not be used nearly at 45 degrees.

Incidentally, it is not required to insert the first quarter-wave plate 103a at the modulating means side and the second quarter-wave plate 103b at the color light combining means in all optical paths, but they may be inserted at least in one optical path depending on the degree of adverse effects of crosstalk due to harmful light. The effects of the present invention are readily obtained by inserting the quarter wave plate and dichroic filter in the conventional system shown in FIG. 8, and it is advantageous that the optical parts used in the color light combining means and modulating means are not required to be particular parts. Although not mentioned specifically, the constituent optical members are coated with anti-reflection treatment (generally AR coating) on the surface contacting with the air.

Embodiment 3

Figure 3:
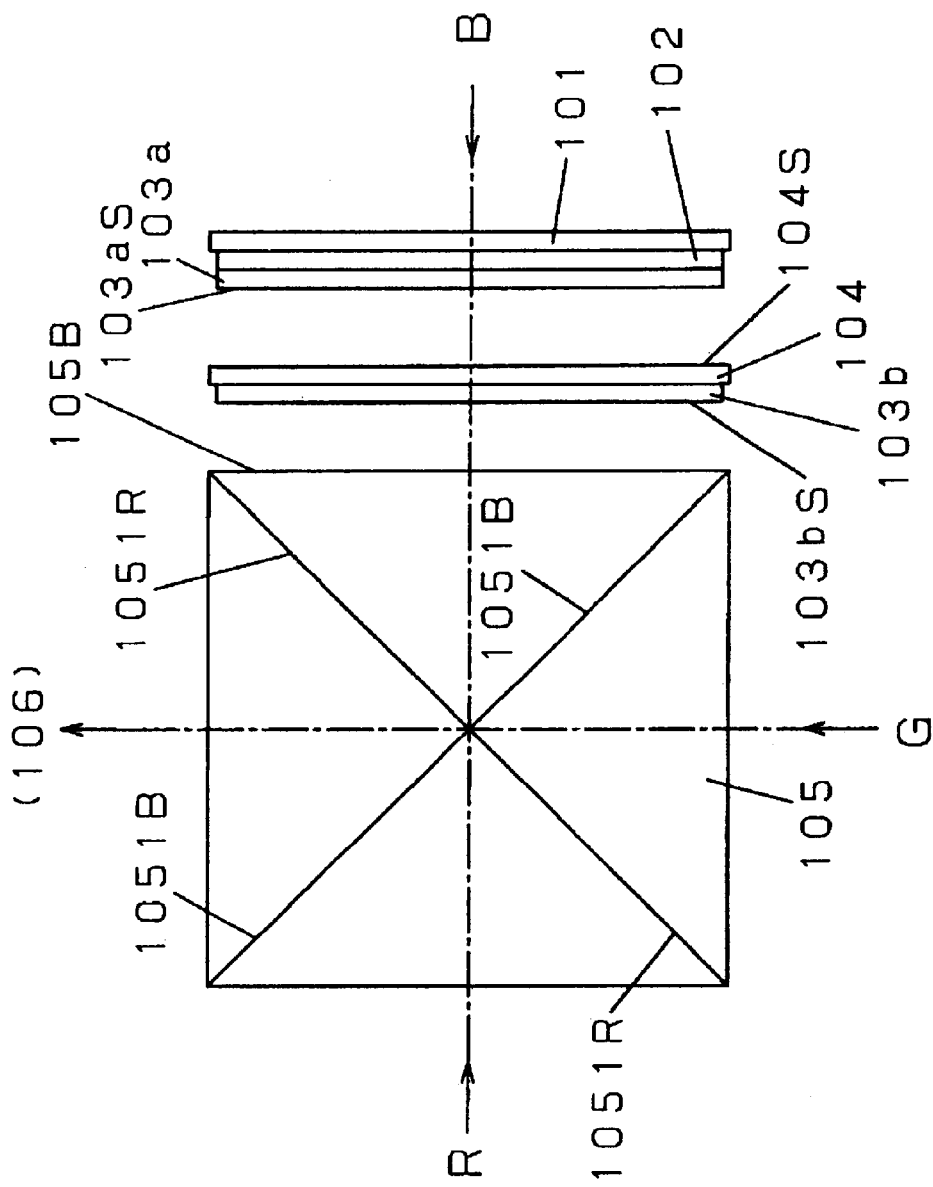
FIG. 3 is a block diagram of embodiment 3 of a projection type video image display device of the invention.

FIG. 3 is a schematic block diagram showing embodiment 3. The first quarter-wave plate 103a of the modulating means side composed in embodiment 2 is disposed closely to the exit side polarizer 102, instead of the dichroic filter 104. In this constitution, the polarized light emitted from the exit side polarizer 102 passes through the first quarter-wave plate 103a, and becomes an elliptical polarized light or circular polarized light, but the return light reflected by the face side of the first quarter-wave plate 103aS passes again the first quarter-wave plate 103a. Hence, the polarized light is a polarized light rotated by nearly 90 degrees from the oscillation direction of the polarized light emitted from the exit side polarizer 102. Therefore, the return light is absorbed by the exit side polarizer 102, and does not reach the liquid crystal light valve 101.

The return light from the face side of the dichroic mirror 104S also receives a similar action, and does not reach the liquid crystal light valve 101. Thus, according to the constitution of embodiment 3, adverse effects of leak light due to other color light can be eliminated almost completely.

The problems are thus eliminated about the return light left over slightly in embodiment 1 and embodiment 2 (that is, the return light reflected by the face side of the exit side polarizer 102S attributable to the difference between the refractive index of the exit side polarizer 102 and the refractive index of air, and the return light reflected by the face side of the first quarter-wave plate 103aS at the modulating means side attributable to the difference between the refractive index of the first quarter-wave plate 103a at the modulating means side and the refractive index of air).

Incidentally, it is not required to constitute as specified above in all optical paths, but it may be constituted at least in one optical path depending on the degree of adverse effects of crosstalk due to harmful light. Although not mentioned specifically, the constituent optical members are coated with anti-reflection treatment (generally AR coating) on the surface contacting with the air.

Embodiment 4

Figure 4:
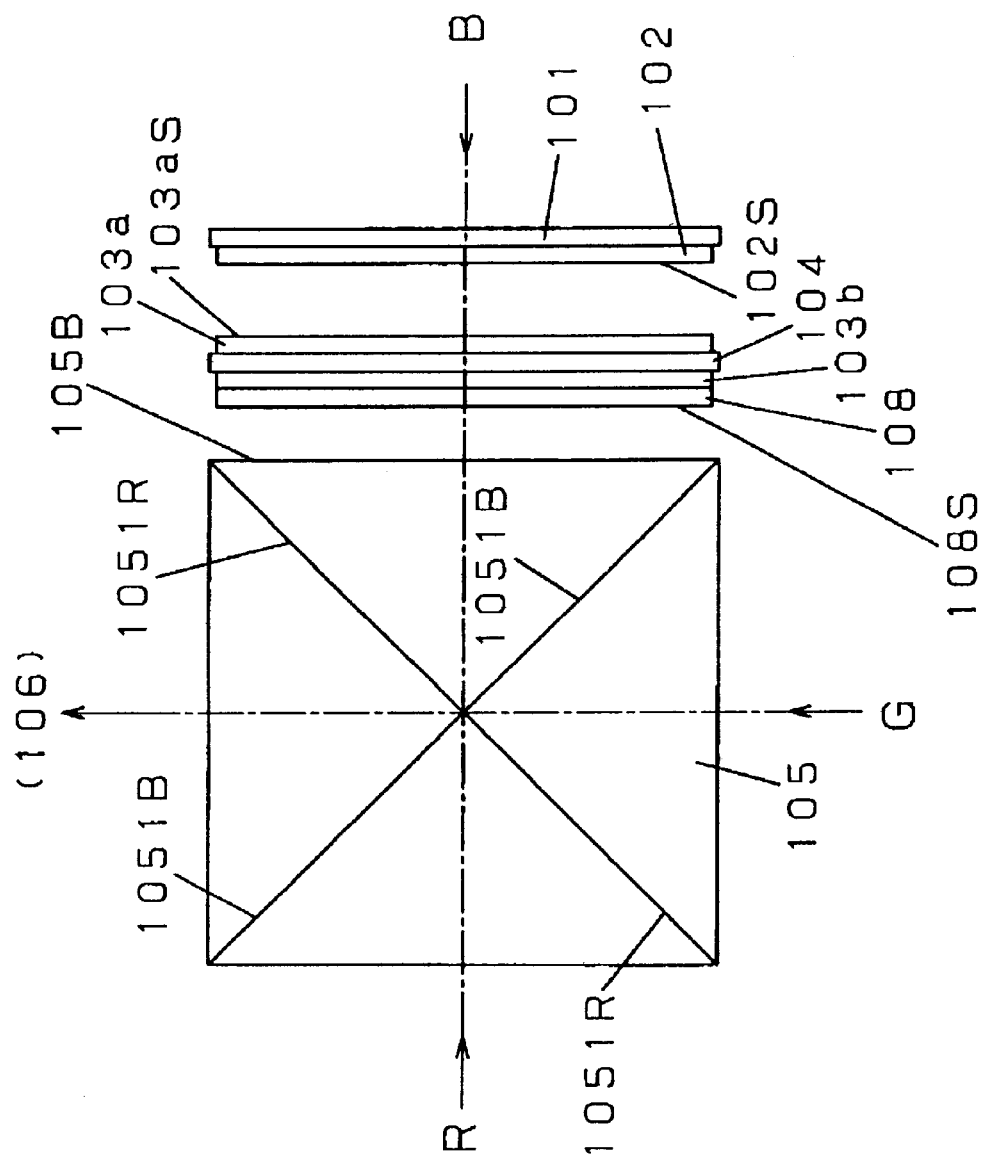
FIG. 4 is a block diagram of embodiment 4 of a projection type video image display device of the invention.

FIG. 4 is a schematic block diagram showing embodiment 4. Closely to the second quarter-wave plate 103b at the color light combining means side in embodiment 2, a half-wave plate 108 is provided as the polarizing direction converting means. In this constitution, the light leaving the half-wave plate 108 can be rotated into a polarized light in the optimum oscillation direction for the color light combining means, and hence it is free from restrictions by the incident light condition limited by the color light combining means and the exit light from the modulating means 101. As a result, the application range of the light leaving the modulating means 101 can be expanded. For example, if the oscillation direction of the polarized light leaving the modulating means 101 is an oscillation direction of about 45 degrees, it is possible to process without problem.

Incidentally, it is not required to constitute as specified above in all optical paths, but it may be constituted at least in one optical path depending on the degree of adverse effects of crosstalk due to harmful light. The effects of the present invention are readily obtained by inserting the quarter wave plate and dichroic filter in the conventional system shown in FIG. 8, and it is advantageous that the optical parts used in the color light combining means and modulating means are not required to be particular parts. Although not mentioned specifically, the constituent optical members are coated with anti-reflection treatment (generally AR coating) on the surface contacting with the air.

Embodiment 5

Figure 5:
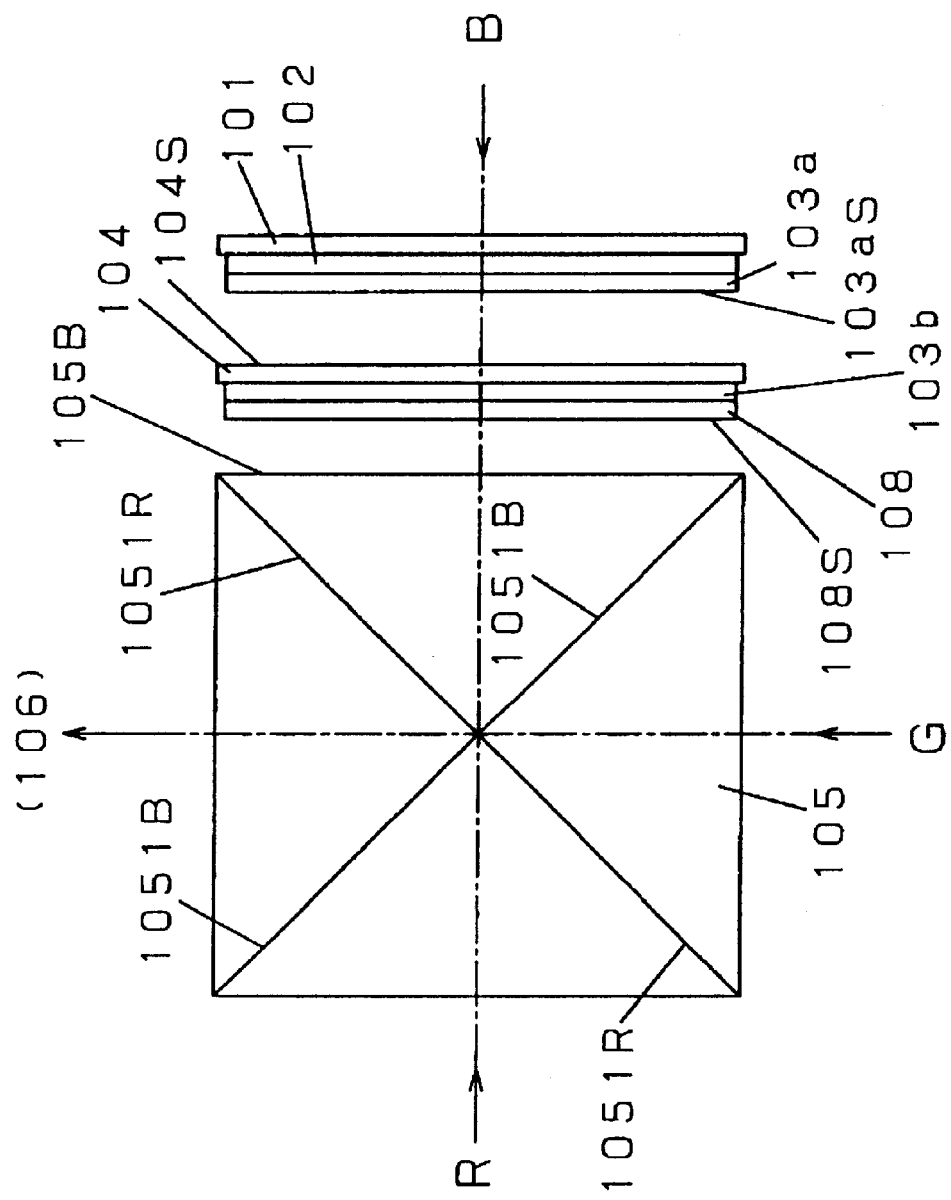
FIG. 5 is a block diagram of embodiment 5 of a projection type video image display device of the invention.

FIG. 5 is a schematic block diagram showing embodiment 5. Closely to the second quarter-wave plate 103b at the color light combining means side in embodiment 3, a half-wave plate 108 is provided. In this constitution, the light leaving the half-wave plate 108 can be rotated into a polarized light in the optimum oscillation direction for the color light combining means 105, and hence it is free from restrictions by the incident light condition limited by the color light combining means 105 and the exit light by the modulating means 105. As a result, the application range of the light emitted from the modulating means 101 can be expanded. For example, if the oscillation direction of the polarized light leaving the modulating means 101 is an oscillation direction of about 45 degrees, it is possible to process without problem.

Incidentally, it is not required to constitute as specified above in all optical paths, but it may be constituted at least in one optical path depending on the degree of adverse effects of crosstalk due to harmful light. Although not mentioned specifically, the constituent optical members are coated with anti-reflection treatment (generally AR coating) on the surface contacting with the air.

Embodiment 6

Figure 6:
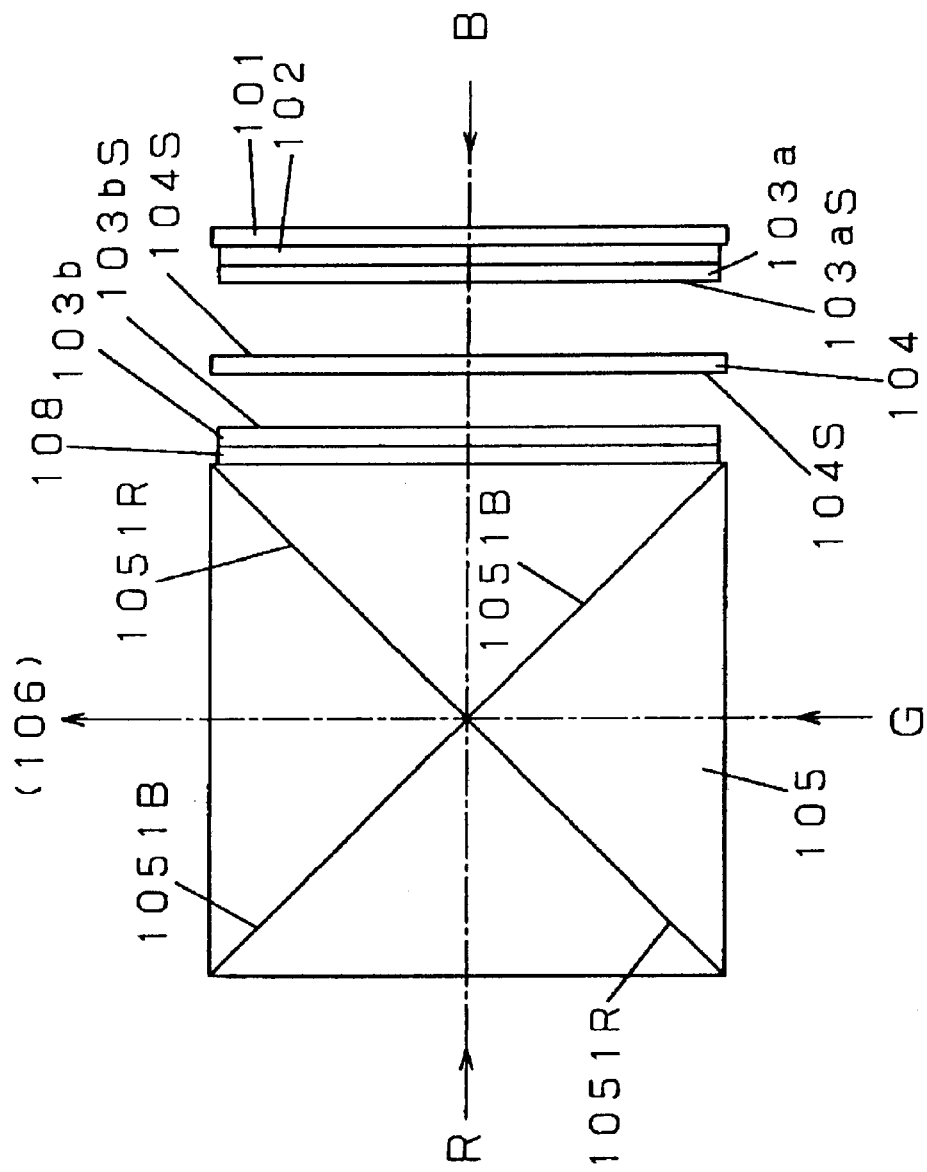
FIG. 6 is a block diagram of embodiment 6 of a projection type video image display device of the invention.

FIG. 6 is a schematic block diagram showing embodiment 6. The second quarter-wave plate 103b and half-wave plate 108 composed in embodiment 5 are disposed closely to the color light combining means 105. In this constitution, the problems are eliminated about the return light left over slightly in embodiment 5 (that is, the return light reflected by the face side of the half-wave plate 108S attributable to the difference between the refractive index of the half-wave plate 108 and the refractive index of air, and the return light reflected by the face side of the color light combining means 105S attributable to the difference between the refractive index of the color light combining means 105 and the refractive index of air).

Newly, moreover, the return light reflected by the face side of the second quarter-wave plate 103bS attributable to the difference between the refractive index of the second quarter-wave plate 103b at the color light combining side and the refractive index of air, and the return light reflected by the face side of the dichroic mirror 104S attributable to the difference between the refractive index of the dichroic filter 104 and the refractive index of air are rotated by the first quarter-wave plate 103a at the modulating means side to be polarized lights rotated on the axis of polarization by about 90 degrees to the axis of polarization emitted from the exit side polarizer 102, and reach the exit side polarizer 102.

The polarized light of the return light rotated by about 90 degrees is absorbed by the exit side polarizer 102 in each optical path, and does not reach the liquid crystal light valve.

Thus, according to the constitution of embodiment 6, adverse effects of the leak light due to other color lights and adverse effects of return light reflected by the intervening optical parts can be eliminated almost completely.

Incidentally, it is not required to constitute as specified above in all optical paths, but it may be constituted at least in one optical path depending on the degree of adverse effects of crosstalk due to harmful light. Although not mentioned specifically, the constituent optical members are coated with anti-reflection treatment (generally AR coating) on the surface contacting with the air.

As described herein from embodiment 1 to embodiment 6, according to the constitution of the invention, it is possible to prevent the light passing through without being reflected in the exit direction on the X-shaped reflection plane of the dichroic prism, or the light reflected by the X-shaped reflection plane, from reaching the side of the liquid crystal light valve. Further, the exit light is prevented from returning as being reflected by the dichroic prism incident plane or exit plane. Therefore, it is possible to shut off the light entering the back side of the liquid crystal light valve without heading toward the optical path advancing direction through the dichroic prism. It hence avoid the problems such as malfunction of the liquid crystal light valve due to light irradiation from the reverse direction of the optical path. As a result, a clear projection image is obtained.

What is claimed is:

1. A projection type video image display device comprising:

a light source for emitting a white light in one direction, color light separating means for separating the white light from said light source into three color lights of red light, blue light and green light, modulating means comprising light valves for modulating polarized lights contained in luminous fluxes from said color light separating means, and producing a video image, color light combining means for combining the modulated luminous fluxes after being modulated by said modulating means, projection optical means for projecting the combined luminous flux obtained by said color light combining means on a screen, a dichroic filter having characteristics for selectively passing and selectively reflecting said color lights from said modulating means disposed between said color light combining means and said modulating means positioned on an optical path of at least one color light of said three color lights of the red light, blue light and green light, a first quarter-wave plate disposed between said dichroic filter and said modulating means, a second quarter-wave plate disposed between said dichroic filter and said color light combining means, and polarizing direction converting means disposed between said second quarter-wave plate and said color light combining means.

2. A projection type video image display device of claim 1, wherein said first quarter-wave plate contacts the face side of said dichroic filter, and said second quarter-wave plate contacts other side of said dichroic filter.

3. A projection type video image display device of claim 1, wherein said polarizing direction converting means contacts said second quarter-wave plate.

4. A projection type video image display device of claim 1, wherein said first quarter-wave plate contacts the face side of said dichroic filter, said second quarter-wave plate contacts the other side of said dichroic filter, and said polarizing direction converting means contacts said second quarter-wave plate.

5. A projection type video image display device of claim 1, wherein said polarizing direction converting means is a half-wave plate.

6. A projection type video image display device comprising:

a light source for emitting a white light in one direction, color light separating means for separating the white light from said light source into three color lights of red light, blue light and green light, modulating means comprising light valves for modulating polarized lights contained in luminous fluxes from said color light separating means, and producing a video image, modulating means, a dichroic filter having characteristics for selectively passing and selectively reflecting said color lights from said modulating means disposed between said color light combining means and said modulating means positioned on an optical path of at least one color light of said three color lights of the red light, blue light and green light, a first quarter-wave plate disposed between said dichroic filter and said modulating means, polarizing direction converting means disposed between said dichroic filter and said color light combining means, closely to said color light combining means, and a second quarter-wave plate disposed between said dichroic filter and said color light combining means.

7. A projection type video image display device of claim 6, wherein said first quarter-wave plate contacts said polarizer, and said second quarter-wave plate contacts said dichroic filter.

8. A projection type video image display device of claim 7, wherein said polarizing direction converting means contacts said second quarter-wave plate.

9. A projection type video image display device of claim 6, wherein said polarizing direction converting means is a half-wave plate.

10. A projection type video image display device comprising:

a light source for emitting a white light in one direction, color light separating means for separating the white light from said light source into three color lights of red light, blue light and green light, modulating means comprising light valves for modulating polarized lights contained in luminous fluxes from said color light separating means, and producing a video image, color light combining means for combining the modulated luminous fluxes after being modulated by said modulating means, projection optical means for projecting the combined luminous flux obtained by said color light combining means on a screen, a polarizer disposed at the light exit side of said color light combining means for combining the modulated luminous fluxes after being modulated by said modulating means, projection optical means for projecting the combined luminous flux obtained by said color light combining means on a screen, a polarizer disposed at the light exit side of said modulating means, a dichroic filter having characteristics for selectively passing and selectively reflecting said color lights from said modulating means disposed between said color light combining means and said modulating means positioned on an optical path of at least one color light of said three color lights of the red light, blue light and green light, a first quarter-wave plate disposed between said dichroic filter and said modulating means, a second quarter-wave plate disposed between said dichroic filter and said color light combining means, and polarizing direction converting means disposed between said second quarter-wave plate and said color light combining means.

11. A projection type video image display device of claim 10, wherein said first quarter-wave plate contacts said polarizer, and said second quarter-wave plate contacts said polarizing direction converting means.

12. A projection type video image display device of claim 10, wherein said polarizing direction converting means is a half-wave plate.

13. The projection type video image display device of claims 1, 6 or 10, wherein said light valves are light valves for about 45 degrees polarizing.

* * * * *